United States Patent [19]
Ford

[11] Patent Number: 6,090,276
[45] Date of Patent: Jul. 18, 2000

[54] INTEGRATED CLOSED LOOP CENTRIFUGAL SEPARATOR AND FILTER TO REMOVE SOLIDS FROM A LIQUID STREAM

[75] Inventor: Steven D. Ford, Clovis, Calif.

[73] Assignee: Claude Laval Corporation, Fresno, Calif.

[21] Appl. No.: 09/066,212

[22] Filed: Apr. 24, 1998

[51] Int. Cl.[7] .............................. B01D 36/00; B04C 9/00
[52] U.S. Cl. ..................... 210/167; 210/168; 210/196; 210/295; 210/304; 210/512.1
[58] Field of Search ................................... 210/167, 168, 210/295, 304, 512.1, 196

[56] References Cited

U.S. PATENT DOCUMENTS

| | | |
|---|---|---|
| 3,052,358 | 9/1962 | Stoermer . |
| 3,259,246 | 7/1966 | Stavenger . |
| 3,529,724 | 9/1970 | Maciula . |
| 3,776,385 | 12/1973 | Maciula et al. . |
| 4,265,740 | 5/1981 | Luthi . |
| 4,451,366 | 5/1984 | Smisson . |
| 4,865,751 | 9/1989 | Smisson . |
| 5,047,157 | 9/1991 | Hoffman et al. . |
| 5,368,735 | 11/1994 | Ford . |
| 5,811,006 | 9/1998 | Ford . |
| 5,879,545 | 3/1999 | Antoun . |

*Primary Examiner*—Thomas M. Lithgow
*Attorney, Agent, or Firm*—Donald D. Mon

[57] ABSTRACT

A separator for separating solids from a liquid/solid mixture. The separator has a cylindrical separation chamber in which a stream is subjected to centrifugal forces against a separation wall. An exit port near the bottom of the separation chamber passes solids and some liquid into a filter chamber where the liquid passes through the filter and in response to a negative pressure in the separation chamber the liquid is made to return the separation chamber.

4 Claims, 1 Drawing Sheet

INTEGRATED CLOSED LOOP CENTRIFUGAL SEPARATOR AND FILTER TO REMOVE SOLIDS FROM A LIQUID STREAM

FIELD OF THE INVENTION

A centrifugal separator separates solids from a liquid stream, sending the stream to a user device and the solids accompanied by carrier liquid to a filter for collection, and returning the carrier liquid to the separator and thus to its output stream in response to a negative differential pressure in the separator.

BACKGROUND OF THE INVENTION

Separation of solids from a liquid stream, using centrifugal separators is a well-established art. A stream of solids-laden liquid, often from a user device, usually water or an oil, are injected tangentially into a cylindrically-walled separation chamber. The stream whirls around the wall at a high speed while it also passes axially along the wall. Centrifugal forces move the solids closer to the wall.

The direction of axial flow is reversed at a spin plate that extends laterally in or adjacent to the separation chamber. At this point, the axial direction of the liquid stream reverses, and the stream, less solids, then flows upwardly closer to the axis of the chamber to an outlet port which may connect to the user device. Adjacent to the spin plate there is a gap through which the solids escape and flow into a collection chamber along with some of the liquid. The liquid which accompanies the solids is for convenience called a "carrier" liquid. In the existing art, the solids are collected from the collection chamber along with the carrier liquid.

A typical separator utilizing the above technique is shown in Steven D. Ford U.S. Pat. No. 5,368,735, issued Nov. 29, 1994 which is incorporated herein in its entirety for its showing of a suitable separator and full details of its operation.

The separators enjoy widespread use. In coarser applications they remove trash, cuttings, and trimmings from usable water in food processing plants, or in agricultural streams to remove particulates such as sand and trash, and in food preparation, such as in hot oil fryers for poultry and chips. Other examples are in mechanical workshops and machine shops where cuttings and chips must be separated from a cutting oil. Frequently the separator is connected in a closed circuit with a user device, receiving solid-laden liquid, removing solids, and returning the liquid for re-use. In other applications, the liquid is forwarded for another use, such as irrigation.

These separators collect the solids in the collection chamber, from which they are removed as a wet sludge or suspension. This is disposed of in various ways. When the liquid is benign and the solids are not objectionable, they are merely inconvenient trash and are disposed of as such. However, many times the carrier liquid may be toxic, such as cutting oils, and the collection must be disposed of as such, the carrier liquid adding to the costs or it may be inconvenient, for example a hot oil which is liquid while hot but which solidifies when cool. This becomes a very inconvenient thing to handle, especially when inexperienced help is utilized. An example found in fried food stands.

There are more demanding applications, where increased separation efficiency can greatly affect the economics of the entire operation. An example is in the cooking of masses in hot oil to create food products such as corn chips and potato chips. The cooking oil is costly, and must be kept clean of overcooked particulates that could change the flavor and appearance of the product. Any extension of time that a given change of oil can be used before it must be changed has a profound effect on the size of the manufacturing operation because of the cost of the oil and of the shut-down time needed to change the oil and clean the system. Deferring these events, enabling a longer use of the same oil, increases plant capacity and lowers the oil cost. Similar considerations apply in other fields, also.

In addition, there are safety considerations. When inflammable liquids are treated such as fuels, it is essential that no sparks be generated. A feature of this invention is that it is self-powered, and there are no moving parts or electrical connections. All power is supplied by the force and pressure of incoming the stream itself.

As a corollary, this invention, being self-powered, requires no energy beyond that which is provided by the stream itself (or the external pump which pressurizes it), and which is necessary for the separator to operate.

It will be noted that the only loss of liquid is that which is entrained in the collected solids, which is minimal. This improves the economy of the process, especially when large amounts of costly liquids are involved.

It is an object of this invention to provide in combination a centrifugal separator and a filter which, when linked according to this invention, will provide a nearly-dry collection of particulates (solids) with only minimal carrier liquid. The collected solids are accordingly much simpler to dispose of. The positive retention of the solids greatly reduces any tendency of solids to ingrate back into the liquid stream. The very clean effluent from the filter is returned to the stream, and improves the quality of the liquid that returns to the stream.

BRIEF DESCRIPTION OF THE INVENTION

A separator system according to this invention includes a centrifugal separator of the type which has a cylindrically-walled separation chamber into which a solids-burdened liquid stream is injected under pressure. The stream is directed tangentially, and flows axially while it swirls around the axis of the cylinder. The solids migrate toward the wall as tie consequence of the centrifugal force.

A spin plate extending laterally in the separation chamber reverses the axial direction of flow. Solids escape through a gap adjacent to the spin plate, and the liquid, less the solids, flows centrally in the opposite direction to a point of use.

An important feature of this invention is the utilization of a negative differential pressure at the center of the spin plate. It is a pronouncedly reduced pressure which is employed for the purposes to be discussed.

The solids, necessarily accompanied by some "carrier" liquid fall to the bottom of a collection chamber, from which they flow with the carrier liquid to a filter chamber which contains a filter that will retain particulates down to a selected size. The carrier liquid passes through the filter as a liquid which has fewer particulates than the liquid which was returned to the system by the separator.

According to this invention the exit port from the filter chamber is fluidly connected to an aperture through the spin plate where the negative differential pressure exists. The filtered carrier liquid is returned to the system at this point driven entirely by the differential pressure. The solids are significantly dried, and loss of liquid is minimized.

According to a preferred but optional feature of this invention, the filter may be provided as a bag which the solids are collected, and which can conveniently be removed and discarded.

BRIEF DESCRIPTION OF THE DRAWINGS

FIG. 2 is a cross-section taken at line 2—2 in FIG. 1. accompanying drawings, in which:

DETAILED DESCRIPTION OF THE INVENTION

Figure 1:
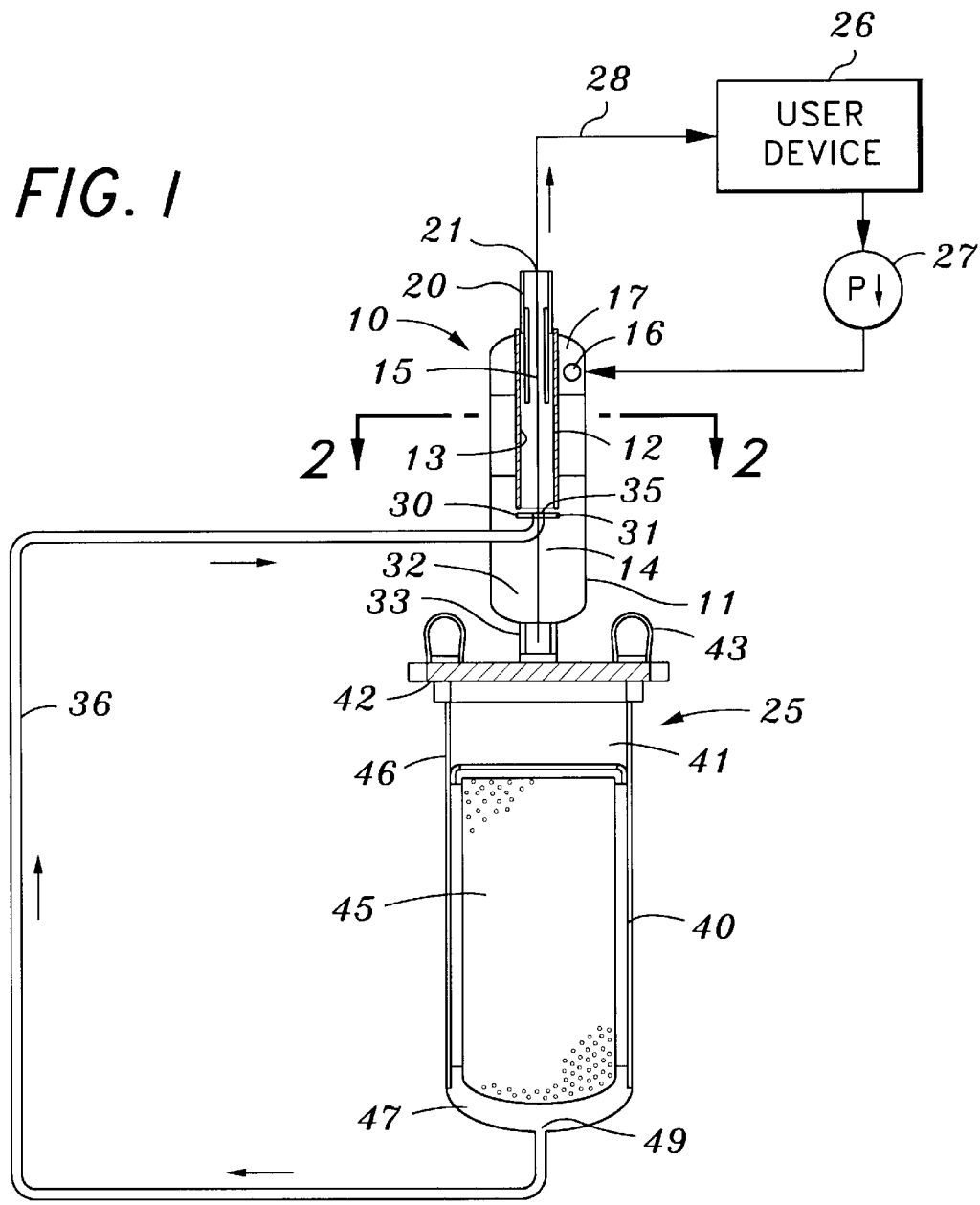
FIG. 1 is a semi-schematic axial section of the presently-preferred embodiment of the invention.
Figure 2:
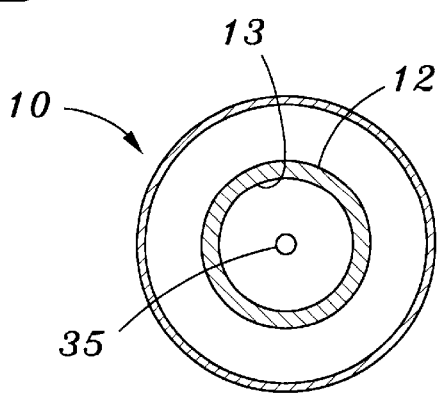

A centrifugal separator 10 according to this invention is shown in FIG. 1. It includes a housing 11 that encloses a separation barrel 12 which has an internal cylindrical wall 13 with a central axis 14, forming a separation chamber 15. An inlet nozzle 16 from inlet port 17 directs a solids-burdened liquid stream under pressure into the separation chamber directed tangentially against wall 13. The resulting stream will flow axially as it swirls around the wall.

An outlet tube 20 extends axially into the separation chamber, forming an outlet port 21 from which the liquid stream will be returned to the source stream or to a user device.

System 25 is schematically shown. It may include any user device 26 such as a food fryer, a parts c leaner, or a burdened water stream, as examples. If there is no t a closed circuit with a user device, the effluent from port 21 will be directed to an end point of use, from which the stream will not return. Pump 27 removes solids-burdened liquid from the user device or other source and forces it into the separator. Outlet port 21 is connected by conduit 28 to the user device or to whatever destruction is intended. Notice that the only power required by this system is for the pump, and it may be located anywhere. The separation and filtering devices have no con tact with a power source. This portion of an entire system is self powered. Importantly, the additional features of this invention do not require an additional power sources, because pressure is already needed to provide a pressurized stream for any centrifugal separator.

Further with regard to the separator, at an axial distance from the outlet tube, a spin plate 30 extends laterally in the separation chamber. It may, but need not extend all the way a cross the separation barrel. In any event, a gap 31 adjacent to it enables solids to escape from the barrel into a collection chamber 32 located below the spin plate. A solids outlet 33 is formed at the bottom of this chamber to release solids that are collected in it. They move by gravity toward this port.

An aperture 35 through the spin plate, on the axis, enters the separation chamber at the point where the liquid stream, as a consequence of its motion, generates a reduced pressure. A return conduit 36 enters the collection chamber through the wall of the separation housing, and connects to aperture 35 in the spin plate so as to open into the separation chamber at the top center of the spin plate.

A rigid filter housing 40 is formed with a filter chamber 41 closed at its top by a removable rigid closure 42. Fasteners 43 of any suitable type hold the closure in a fluid-tight fit with the housing. A filter 45 of any suitable type that has pores or passages of suitable size is preferably formed as a flexible bag held at its top by a support 46 so as to leave a spacing 47 at least at the bottom of the filter chamber in which liquid will collect after passing through the filter. A filter outlet port 49 at the bottom of filter housing 40 is connected to return conduit 36.

Now it will be seen that the separator performs its usual function of causing solids to migrate toward the wall of the separation chamber, move into the collection chamber, and settle toward the bottom of the separation chamber for removal. The separation chamber is a vigorous region, and some of the solids will unavoidably return to it, or remain in it, to be returned to the user device or the downstream destination. However, this is often a continuously operating and recirculating device. Each successive pass through the separator further improves the situation. Even with only a single pass, the situation is improved.

The solids move from the collection chamber along with the carrier liquid to the filter chamber, where they are retained by the filter. The liquid flow through the filter is encouraged by the negative pressure in return conduit 36 which is derived from the central region above the spin plate. Accordingly, liquid which has been filtered to a higher polish by the filter will be returned to the separation chamber to and to the separator output to join with the liquid that flows upwardly from the spin plate. This clearer liquid improves the condition of the total stream, because it contains less solids than the liquid which did not pass through the filter.

The negative pressure across the filter itself tends to remove a greater amount of water at a faster rate than a mere gravity flow would produce. The final collected product can approach a nearly-damp condition, and can readily be handled and disposed of in a closed filter bag.

Appropriate values may be provided to isolate all or part of the separation system from the user system, as to isolate the filter from the separator to facilitate servicing the device, for example, a shut-off valve (not shown) in port 33. If desired, multiple filter housings, filters, and shut-off valves may be provided so that the system can continue to operate while one filter is serviced, another can continue to function.

The dimensions of the separator and filter chamber are optional and are selected for pressures and rates appropriate to the intended nature and capacity of the system. Separators for this purpose are manufactured by Claude Laval Corporation, of Fresno, Calif. One suitable example is its LAX-0409-B which attends to a throughput rate of 275–500 gpm of water at an inlet pressure 2000 PSI.

While a porous filter as shown in the drawings is the preferred means for retaining the solids, it is within the scope of this invention to omit the filter and to use a suitably large housing 40 in which solids can collect, and to draw liquid from a region above it where the solids have settled out suitably. Then the return conduit would enter nearer the top of chamber 41, and suitable baffles could be provided to still the movement of solids in the chamber, the returned liquid might be a bit less clean but still improved. The term "filter" is used herein to include settling arrangements as just described.

This invention is not to be limited by the embodiment shown in the drawings and described in the description, which is given by way of example and not of limitation, but only in accordance with the scope of the appended claims.

I claim:

1. A system for separating solids from the liquid in a solids-laden liquid stream, comprising:

a centrifugal separator having a housing, a separation barrel with an internal cylindrical wall which forms an axially-extending separation chamber, an inlet port, an inlet nozzle from said inlet port for injecting said stream tangentially against said cylindrical wall whereby said stream flows axially as it whirls around said axis, an outlet tube extending axially into said separation chamber, an outlet port from said outlet tube, a spin plate extending laterally in said separation chamber having an aperture therethrough on said axis, a collection chamber beneath said spin plate, and a drain port from said collection chamber;

a filter assembly comprising a rigid fluid tight filter housing, a porous filter supported in said housing, a filter inlet connected to said drain port, said porous filter positioned in the filter housing to receive substantially all of the solids and carrier liquid passing through the port at one side of said filter, and a return port through said filter housing from a drain region on the opposite side of said filter; and a return conduit interconnecting said return port in said filter housing and said aperture in said spin plate so the drain region in the filter housing is fluidly connected to the separation chamber on the side of the spin plate which faces into the separation chamber.

2. A system according to claim 1 in which said filter comprises a bag made of a filtering medium, removable from said filter housing.

3. A system according to claim 1 in which a user device includes a user inlet and a user outlet is coupled with said separator in a closed loop, said user inlet being connected to the outlet port of the separator, and the user outlet being connected to the inlet port of the separator.

4. A system according to claim 3 in which said filter comprises a bag made of a filtering medium, removable from said filter housing.

* * * * *